United States Patent [19]
Kreitzer

[11] Patent Number: 5,991,089
[45] Date of Patent: Nov. 23, 1999

[54] LONG FOCAL LENGTH PROJECTION LENSES FOR USE WITH LARGE PIXELIZED PANELS

[75] Inventor: Melvyn H. Kreitzer, Cincinnati, Ohio

[73] Assignee: U.S. Precision Lens Inc., Cincinnati, Ohio

[21] Appl. No.: 09/015,026

[22] Filed: Jan. 28, 1998

Related U.S. Application Data

[60] Provisional application No. 60/037,266, Jan. 31, 1997.

[51] Int. Cl.[6] ............................................. G02B 3/00
[52] U.S. Cl. ................................................... 359/649
[58] Field of Search .................................. 359/649, 650, 359/651, 692, 662

[56] References Cited

U.S. PATENT DOCUMENTS

| | | | |
|---|---|---|---|
| Re. 35,310 | 8/1996 | Moskovich | 359/651 |
| 2,468,564 | 4/1949 | Luneburg | 359/651 |
| 4,189,211 | 2/1980 | Taylor | 359/663 |
| 4,425,028 | 1/1984 | Gagnon et al. | 359/246 |
| 4,461,542 | 7/1984 | Gagnon | 349/8 |
| 4,526,442 | 7/1985 | Betensky | 359/651 |
| 4,548,480 | 10/1985 | Yamamoto et al. | 359/650 |
| 4,564,269 | 1/1986 | Uehara | 359/650 |
| 4,704,009 | 11/1987 | Yamamoto et al. | 359/649 |
| 4,826,311 | 5/1989 | Ledebuhr | 353/31 |
| 4,838,667 | 6/1989 | Ueda | 359/692 |
| 4,838,670 | 6/1989 | Ueda et al. | 359/649 |
| 5,042,929 | 8/1991 | Tanaka et al. | 359/708 |
| 5,179,473 | 1/1993 | Yano et al. | 359/691 |
| 5,200,861 | 4/1993 | Moskovich | 359/662 |
| 5,218,480 | 6/1993 | Moskovich | 359/753 |
| 5,278,698 | 1/1994 | Iizuka et al. | 359/682 |
| 5,313,330 | 5/1994 | Betensky | 359/676 |
| 5,331,462 | 7/1994 | Yano | 359/689 |
| 5,353,161 | 10/1994 | Ono | 359/691 |
| 5,442,484 | 8/1995 | Shikawa | 359/651 |
| 5,625,495 | 4/1997 | Moskovich | 359/663 |
| 5,659,424 | 8/1997 | Osawa et al. | 359/649 |

FOREIGN PATENT DOCUMENTS

| | | |
|---|---|---|
| 311116 | 4/1989 | European Pat. Off. . |
| 0809407 | 11/1997 | European Pat. Off. . |
| 61-205909 | 12/1986 | Japan . |
| WO 97/41461 | 11/1997 | WIPO . |

OTHER PUBLICATIONS

*The Handbook of Plastic Optics*, U.S. Precision Lens, Inc., Cincinnati, Ohio, 1983, pp. 17–29.

*Primary Examiner*—Georgia Epps
*Assistant Examiner*—Jordan M. Schwartz
*Attorney, Agent, or Firm*—Maurice M. Klee

[57] ABSTRACT

Projection lens having long focal lengths for use with LCD panels are provided. The lenses have a first lens unit which has a positive power and a second lens unit which has a negative power. The first lens unit contains at least three lens elements organized into two subunits, namely, a positive first lens subunit having a positive lens element and a negative lens element and a positive second lens subunit having a positive lens element. The second lens unit contains at least two lens elements, namely, a positive lens element and a negative lens element. The projection lens preferably employs only five lens elements arranged in a positive, negative, positive, positive, negative configuration.

16 Claims, 3 Drawing Sheets

LONG FOCAL LENGTH PROJECTION LENSES FOR USE WITH LARGE PIXELIZED PANELS

CROSS REFERENCE TO RELATED PROVISIONAL APPLICATION

This application claims the benefit under 35 USC §119(e) of U.S. Provisional Application Ser. No. 60/037,266 filed Jan. 31, 1997, which is hereby incorporated by reference.

FIELD OF THE INVENTION

This invention relates to projection lenses and, in particular, to projection lenses which can be used, inter alia, to form an image of an object composed of pixels, e.g., a LCD.

BACKGROUND OF THE INVENTION

Figure 3:
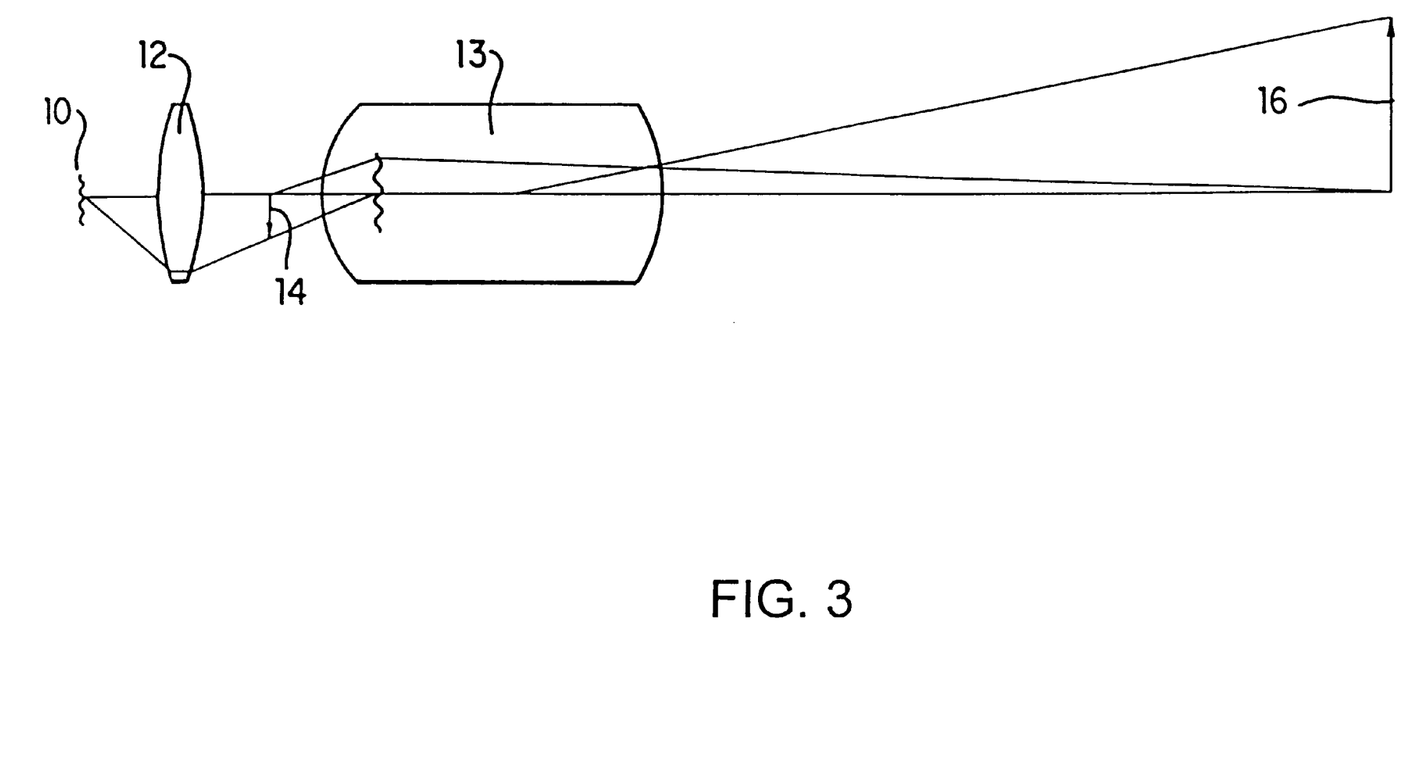
FIG. 3 is a schematic diagram showing an overall projection lens system in which the projection lenses of the present invention can be used.

Projection lens systems (also referred to herein as "projection systems") are used to form an image of an object on a viewing screen. The basic structure of such a system is shown in FIG. 3, wherein 10 is a light source (e.g., a tungsten-halogen lamp), 12 is illumination optics which forms an image of the light source (hereinafter referred to as the "output" of the illumination system), 14 is the object which is to be projected (e.g., a LCD matrix of on and off pixels), and 13 is a projection lens, composed of multiple lens elements, which forms an enlarged image of object 14 on viewing screen 16. The system can also include a field lens, e.g., a Fresnel lens, in the vicinity of the pixelized panel to appropriately locate the exit pupil of the illumination system.

Projection lens systems in which the object is a pixelized panel are used in a variety of applications, including data display systems. Such projection lens systems preferably employ a single projection lens which forms an image of, for example, a single panel having red, green, and blue pixels.

Pixelized panels, specifically, LCD panels, come in various sizes depending upon the type of projection system in which they are to be used. Large LCD panels, e.g., panels having a diagonal of from about 5.0 inches (about 130 millimeters) to about 10.6 inches (about 270 millimeters), can be effectively employed in producing high resolution color images since such panels can have a high pixel count while still maintaining a pixel size which is large enough for reliable manufacture. In this regard, it should be noted that for a full color image from a single LCD panel, the number of pixels needed is three times that required for a monochrome image, thus making for small pixel sizes unless large LCD panels are used.

There exists a need in the art for projection lenses for use with pixelized panels which simultaneously have at least the following properties:

(1) a long focal length;
(2) a relatively simple construction, i.e., a relatively small number of lens elements;
(3) a high level of color correction;
(4) low distortion; and
(5) low sensitivity to temperature changes.

For certain applications, it is desirable for a projection lens having the foregoing properties to also having the following two additional properties:

(6) the ability to operate (focus) over a wide range of magnifications (conjugates) while maintaining an efficient coupling to the output of the illumination system and a high level of aberration correction (hereinafter referred to as the "lens' focus range"); and
(7) the ability to provide a range of magnifications for any set of conjugates in the lens' focus range while again maintaining an efficient coupling to the output of the illumination system and a high level of aberration correction (hereinafter referred to as the "lens' zoom range").

For a large pixelized panel, the use of a long focal length allows the field of view of the projection lens to be maintained in a range which facilitates aberration correction, e.g., the semi-field of view of the lens can be less than 15°. Also, a long focal length permits a long throw distance which is desirable in large auditoriums.

A relatively simple construction is desirable from a cost, weight, and size point of view. Large numbers of lens elements consume more raw materials, weigh more, and are more expensive to build and mount. Accordingly, a lens with a minimum number of lens elements is desired.

As is well known in the art, lenses which are capable of zooming generally employ numerous elements in a complex structure to simultaneously provide focal length changes and aberration correction. Accordingly, properties (2) and (7) above work against one another in arriving at a suitable lens design.

In this regard, it has been found that a mini-zoom range, e.g., a zoom range in terms of image height at the viewing screen (object height in the tables) of 15% or less (±7.5% or less from the center point of the zoom range), is sufficient to meet the great majority of the zooming needs of users of LCD projection lens systems. Moreover, it has been further found that such mini-zoom ranges can be achieved using simple lens designs which employ at most one additional lens element and, in many cases, no additional lens elements than a fixed focal length design which can achieve a similar image quality over a similar focus range. In this way, the incompatibility of properties (2) and (7) can be overcome.

More particularly, by limiting the zoom range, it has been found possible to design the lenses of the invention by: 1) designing a non-zooming lens which will achieve the desired focus range, 2) selecting a lens unit of such a design which will be moved during zooming, and 3) reoptimizing the design with the selected lens unit being moved to achieve the desired zoom range. In practice, it has been found that the zooming version of the lens requires the addition of at most one lens element and, in many cases, no lens element, to achieve limited zooming while maintaining a desired focus range.

Property (3), i.e., a high level of color correction, is important because color aberrations can be easily seen in the image of a pixelized panel as a smudging of a pixel or, in extreme cases, the complete dropping of a pixel from the image. These problems are typically most severe at the edges of the field.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels, the lenses of the examples being designed for such use. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of a room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. They are also heavier. As described below, plastic elements can be used and temperature insensitivity still achieved provided the powers and locations of the plastic elements are properly chosen.

Optional property (6), i.e., the ability to efficiently operate over a wide range of magnifications (a large focus range), is desirable since it allows the projection system to be used with screens of different sizes and halls of different dimensions without the need to change any of the components of the system. Only the object and image conjugates need to be changed which can be readily accomplished by moving the lens relative to the pixelized panel. The challenge, of course, is to provide efficient coupling to the output of the illumination system and a high level of aberration correction throughout the operative range of magnifications.

The ability to change the magnification of the image for a given set of image and object conjugates, i.e., the ability to zoom, has similar benefits. In this case, the changes in magnification are used for fine tuning of the image to, for example, fully fill a viewing screen.

It should be noted that while properties (6) and (7) above, i.e., focusing and zooming, both involve magnification changes, the magnification changes are achieved in fundamentally different ways. Thus, during focusing, the focal length of the lens remains substantially constant as the image and object conjugates change, and the magnification change is a result of the change in the ratio of those conjugates. During zooming, on the other hand, the focal length changes while the image and object conjugates remain constant, and the magnification change is a result of the change in the focal length. (Note that in Table 1 below, the focal lengths shown include the Fresnel lens which remains fixed during focusing (and zooming). As a result, the focal length of the lens appears to change during focusing, when in fact it is remaining constant for the lens elements which move during focusing. Also, the lenses of the tables include means for accommodating for changes in the focus of the lens resulting from zooming. In particular, the tables show some changes in conjugates during zooming which achieve these focus corrections.) The projection lenses described below achieve all of the above requirements and can be successfully used in producing relatively low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Moskovich, U.S. Pat. No. 5,625,495, Iizuka et al., U.S. Pat. No. 5,278,698, Betensky, U.S. Pat. No. 5,313,330, and Yano, U.S. Pat. No. 5,331,462.

Discussions of LCD systems can be found in Gagnon et al., U.S. Pat. No. 4,425,028, Gagnon, U.S. Pat. No. 4,461,542, Ledebuhr, U.S. Pat. No. 4,826,311, and EPO Patent Publication No. 311,116.

SUMMARY OF THE INVENTION

In view of the foregoing, it is an object of the present invention to provide improved projection lenses for use with a pixelized panel which simultaneously have each of properties (1) to (5) discussed above and preferably also have properties (6) and (7). This object is achieved by means of a projection lens which has an optical power $P_0$ and comprises in order from its image side to its object side (i.e., from its long conjugate side to its short conjugate side):

(A) a first lens unit (U1) having a positive power $P_1$, said first lens unit comprising in order from its image side to its object side:
   (i) a first lens subunit ($U1_{S1}$) having a positive power $P_{S1}$; and
   (ii) a second lens subunit ($U1_{S2}$) having a positive power $P_{S2}$, said second lens subunit being spaced from said first lens subunit by an axial distance $D_{S1S2}$; and (B) a second lens unit (U2) having a negative power $P_2$, said second lens unit being spaced from said first lens unit by an axial distance $D_{12}$ and comprising in order from its image side to its object side:
   (i) a positive lens element ($L_{2P}$) having a power $P_{2P}$; and
   (ii) a negative lens element ($L_{2N}$) having a power $P_{2N}$, said negative lens element being spaced from said positive lens element by an axial distance $D_{2P2N}$.

In their preferred embodiments, the projection lenses of the invention have some and, most preferably, all of the following characteristics:

(1) the first lens subunit comprises (most preferably, consists of) a positive lens element ($L_{1P}$) and a negative lens element ($L_{1N}$), the positive lens element being on the image side of the first lens subunit and the negative lens element being on the object side of that subunit, said positive and negative lens elements being separated by an axial distance $D_{1P1N}$;

(2) $L_{1P}$ is composed of a low dispersion plastic material, e.g., acrylic, and has at least one aspherical surface;

(3) $L_{1N}$ is composed of a high dispersion glass material, i.e., a flint glass;

(4) $L_{1N}$ has spherical surfaces;

(5) the second lens subunit consists of a single lens element ($L_2$);

(6) $L_2$ is composed of glass and has spherical surfaces;

(7) the second lens unit consists of $L_{2P}$ and $L_{2N}$;

(8) $L_{2P}$ is composed of glass and has spherical surfaces;

(9) $L_{2N}$ is composed of a low dispersion plastic material, e.g., acrylic, and has at least one aspherical surface;

(10) the projection lens consists of only five lens elements; and/or (11) the projection lens satisfies some or, preferably, all of the following numerical limitations:

(i) $1.0 < P_1/P_0 < 2.0$;
(ii) $0.1 < P_{S1}/P_0 < 0.4$;
(iii) $1.0 < P_{S2}/P_0 < 2.0$;
(iv) $0.5 < |P_2|/P_0 < 2.0$;
(v) $0.5 < P_{2P}/P_0 < 1.5$;
(vi) $1.5 < |P_{2N}|/P_0 < 3.0$;
(vii) $0.05 < D_{12}/f_0 < 0.25$;
(viii) $0.1 < D_{S1S2}/f_0 < 0.4$;
(ix) $0.005 < D_{1P1N}/f_0 < 0.1$; and/or
(x) $0.03 < D_{2P2N}/f_0 < 0.2$;

where $f_0 = 1/P_0$, $D_{12}$ is measured from the object most surface of the first lens unit to the image most surface of the second lens unit, $D_{S1S2}$ is measured from the object most surface of the first lens subunit to the image most surface of the second lens subunit, $D_{1P1N}$ is measured from the object most surface of the positive lens element of the first lens subunit to the image most surface of the negative lens element of that subunit, and $D_{2P2N}$ is measured from the object most surface of the positive lens element of the second lens unit to the image most surface of the negative lens element of that unit.

Focusing of the projection lens is preferably achieved by moving $U1_{S1}$ relative to the pixelized panel and then moving the rest of the lens relative to $U1_{S1}$, while zooming, specifically, zooming on the order of 10%, is achieved by moving the first and second lens units relative to the pixelized panel at different rates.

The projection lenses of the invention are preferably designed using the location of the output of the illumination system as a pseudo-aperture stop/entrance pupil of the projection lens (see Betensky, U.S. Pat. No. 5,313,330, the relevant portions of which are incorporated herein by reference). In this way, efficient coupling is achieved between the light output of the illumination system and the projection lens.

In accordance with these embodiments, the invention provides a projection lens system which forms an image of an object and comprises:

(a) an illumination system comprising a light source and illumination optics which forms an image of the light source, said image being the output of the illumination system;

(b) a pixelized panel which comprises the object; and (c) a projection lens of the type described above, said projection lens having an entrance pupil whose location substantially corresponds to the location of the output of the illumination system.

The projection lenses of the invention are also designed to be substantially athermal. As discussed fully below, this is done by using glass and plastic lens elements and by balancing the powers of the plastic lens elements having substantial optical power. In this way, changes in the power of the positive lens elements caused by temperature changes are compensated for by changes in the power of the negative lens elements, thus providing substantially constant overall optical properties for the projection lens as its temperature changes.

In terms of performance, a preferred level of image quality for the projection lenses of the invention comprises a distortion of less than 1%, more preferably less than 0.5%, a lateral color blur of less than a half a pixel over the range from 470 nanometers to 630 nanometers, and an axial color blur of less than two pixels again over the range from 470 nanometers to 630 nanometers. These performance levels for color correction can be applied at the object or at the image, a magnified pixel being used when the criteria are applied at the image. The performance level for axial color blur is less stringent than that for lateral color blur since axial color manifests itself as a symmetric halo which normally is not as readily detected by the user as is lateral color.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention have the general form of a positive first lens unit and a negative second lens unit. The lenses include at least one aspheric surface and, preferably, multiple aspheric surfaces for use in aberration correction, including correction of spherical aberration, astigmatism, coma, and distortion. Preferably, the positive first lens unit and the negative second lens unit each includes at least one aspheric surface.

As discussed above, correction of distortion is particularly important for lens systems used with pixelized panels. For the lens systems of the invention, the distortion correction is preferably better than about 1.0 percent and more preferably better than about 0.5 percent. These levels of distortion correction should be maintained throughout the lens' focus range and zoom range for lens systems which have these features.

For purposes of color correction, the projection lenses will generally include a negative lens element composed of a high dispersion material and at least one positive lens element composed of a low dispersion material. The high and low dispersion materials can be glass or plastic.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

For plastic lens elements, the high and low dispersion materials can be styrene and acrylic, respectively. Other plastics can, of course, be used if desired. For example, in place of styrene, polycarbonates and copolymers of polystyrene and acrylic (e.g., NAS) having flint-like dispersions can be used. See *The Handbook of Plastic Optics*, U.S. Precision Lens, Inc., Cincinnati, Ohio, 1983, pages 17–29.

Color correction is preferably achieved by including a negative lens element ($L_{1N}$) composed of a flint glass and a positive lens element ($L_{1P}$) composed of an acrylic plastic in the first lens subunit ($U1_{S1}$).

As discussed above, the projection lenses of the invention are athermalized so that the optical performance of the system does not substantially change as the projection lens is heated from room temperature to its operating temperature. More specifically, the thermally-induced change in the modulation transfer function of the system at the system's characteristic spatial frequency is preferably less than about 25%, where the characteristic spatial frequency is equal to one over twice the pixel size. The desired thermal stabilization is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost and lower weight, especially where the lens design involves large lens elements.

If the net plastic optical power in a design is significant, then athermalization needs to be performed or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by balancing positive and negative plastic optical power, while also taking into account both the location of the plastic lens elements and the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small, e.g., elements near the focus of the system, will in general have less effect on the overall thermal stability of the system than elements for which the marginal ray height is large.

Based on the foregoing considerations, athermalization is achieved by balancing the amount of negative and positive power in the plastic lens elements with the contributions of particular elements being adjusted based on the temperature change which the element is expected to undergo and the marginal ray height at the element. In practice, this athermalization procedure is incorporated into a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the pixelized panel hold the distance between the last lens surface and the panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the panel, can be assumed to be mechanically fixed.

Figure 1:
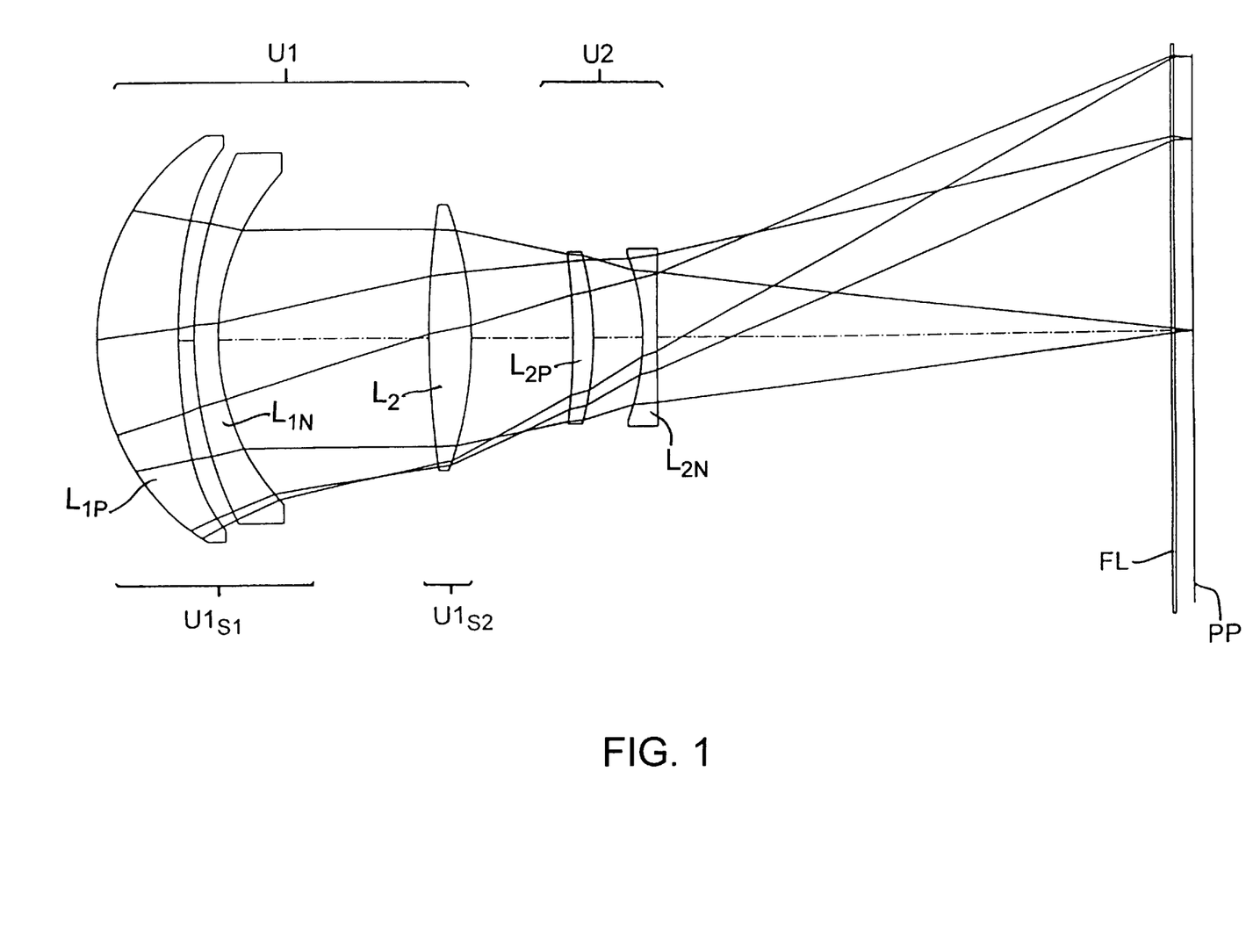
FIGS. 1–2 are schematic side views of projection lenses constructed in accordance with the invention.
Figure 2:
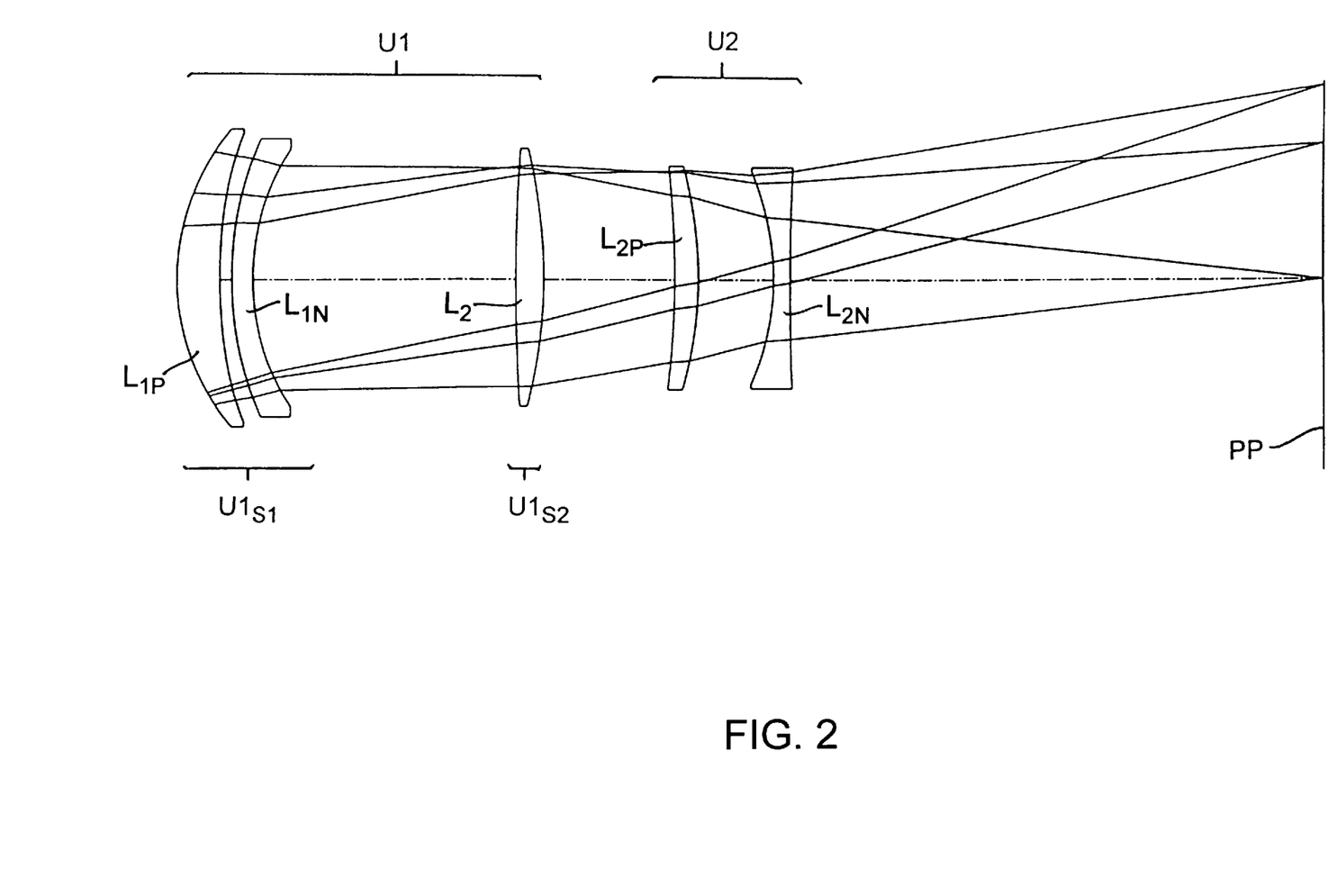

FIGS. 1 and 2 illustrate projection lenses constructed in accordance with the invention. Corresponding prescriptions and optical properties appear in Tables 1 and 2, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1 and 2.

The abbreviations used in the tables are as follows:

| | |
|---|---|
| EFL | effective focal length |
| FVD | front vertex distance |
| f/ | f-number |
| ENP | entrance pupil as seen from the long conjugate |
| BRL | barrel length |
| OBJ HT | object height |
| MAG | magnification |
| STOP | location and size of aperture stop |
| IMD | image distance |
| OBD | object distance |
| OVL | overall length. |

The values for these parameters reported in Table 1 were calculated with the Fresnel lens as part of the system. The designation "a" associated with various surfaces in the tables represents an aspheric surface, i.e., a surface for which at least one of D, E, F, G, H, or I in the above equation is not zero; the designation "c" indicates a surface for which k in the above equation is not zero; and the designation "f" indicates a Fresnel lens. Surface 7 in Table 2 is an optional vignetting surface. All dimensions given in the tables are in millimeters.

The tables are constructed on the assumption that light travels from left to right in the figures. In actual practice, the viewing screen will be on the left and the pixelized panel will be on the right, and light will travel from right to left. In particular, the references in the tables to objects and images are reverse from that used in the rest of the specification and in the claims.

The pixelized panel is shown in the figures by the designation "PP" and the Fresnel lens associated with the pixelized panel where used is shown by the designation "FL". A Fresnel lens is employed in the system of Example 1 because this example uses an especially large pixelized panel and a Fresnel lens helps to provide a near normal angle of incidence for the light from the illumination optics at the panel as is desired.

The correspondence between the various elements and surfaces of the lenses of Tables 1 and 2 and the "first lens unit", "first lens subunit", "second lens subunit", and "second lens unit" terminology discussed above is set forth in Table 3. In particular, in this table, U1 is the first lens unit, $U1_{S1}$ is the first lens subunit of the first lens unit, $U1_{S2}$ is the second lens subunit of the first lens unit, and U2 is the second lens unit.

Table 4 summarizes which of the positions in the Tables 1 and 2 illustrate focusing and which illustrate zooming.

As discussed above, the projection lenses of FIGS. 1 and 2 were designed using the pseudo-aperture stop/entrance pupil technique of Betensky, U.S. Pat. No. 5,313,330. In accordance with this approach, the illumination system is used to define the entrance pupil for the projection lens, with the entrance pupil being located at a constant position relative to the pixelized panel for all lens focal lengths and conjugates. The location of this pupil is determined by the substantially parallel light (substantially telecentric light) which passes through the pixelized panel from the illumination system and the Fresnel lens (when used) which is located at a fixed position on the projection lens side of the panel.

The surface labeled "aperture stop" in Tables 1 and 2 constitutes the pseudo-aperture stop of the above Betensky patent. Its location corresponds to the location of the output of the illumination system. As can be seen in the subtables labeled "Variable Spaces," the distance from the pseudo-aperture stop to the pixelized panel is essentially constant for all focus positions/zoom positions (magnifications) of the projection lens systems of FIGS. 1 and 2 (see the column labeled "Image Distance"). For the focus and zoom positions shown, the variable space which defines the location of the aperture stop relative to the back surface of the projection lens is negative corresponding to the illumination output being located within the space defined by the lens' front and back lens surfaces. It should be noted that although preferred, the pseudo-aperture stop approach does not have to be used in the design of the lenses of the invention. Rather, the lenses can be designed using a conventional aperture stop.

Table 5 summarizes various focusing and zooming properties of the lenses of Tables 1 and 2. The numerical values of this table were calculated with the Fresnel lens as part of the overall system for Example 1. For these lenses, zooming is achieved by moving the first and second lens units relative to one another. Focusing is accomplished by moving the entire lens relative to the pixelized panel, as well as through relative movement of the first and second lens subunits of the first lens unit. Conventional mechanisms known in the art are used to move the lens relative to the pixelized panel and to move the lens' units and subunits relative to one another.

As shown in Table 5, the lenses of the examples achieve a focus range (F) of at least 0.1, where the focus ranges given in this table are based on the preferred distortion, lateral color, and axial color criteria discussed above and are calculated using the following formula:

$$F = \max|h_O/h_I| - \min|h_O/h_I|,$$

where $h_O$ is the object height, $h_I$ is the magnified image height, and $\max|h_O/h_I|$ and $\min|h_O/h_I|$ are the maximum and minimum magnitudes, respectively, of the image-to-object magnification (minification) which the projection lens can achieve while maintaining a desired level of image quality. That is, for the focus ranges set forth in the table, the lenses achieve distortions of less than 1% (see the column labeled "distortion") and color corrections of less than half a pixel and less than two pixels for lateral and axial color, respectively, for wavelengths between 470 nanometers and 630 nanometers.

As also shown in Table 5, the lenses have zoom ranges on the order of 0.1, where the zoom range Z is calculated using the formula:

$$Z = 2*(\max|h_I| - \min|h_I|)/(\max|h_I| + \min|h_I|),$$

where $\max|h_I|$ and $\min|h_I|$ are the maximum and minimum magnitudes, respectively, of the image height as a result of zooming about a $|h_O/h_I|$ ratio in the focus range.

As is well known in the art, any lens which is capable of zooming can be "pushed" beyond its intended zoom range. Such "pushing", of course, leads to a degradation in the performance of the lens. The degradation, however, is generally not precipitous and generally does not affect all performance parameters at the same rate. Accordingly, as used herein, the zoom range of a projection lens is that range of zooming for which if the range were to be increased by 50%, e.g., to 22.5% for a 15% range, at least at some point in such an increased range, either the distortion would increase above 1% and/or the lateral color blur would increase above half a pixel in the range from 470 nanometers to 630 nanometers and/or the axial color blur would increase above two pixels again in the range from 470 nanometers to 630 nanometers and/or the movement of lens elements would be restricted by the physical structure of the lens and its supporting structures.

The "limitation" column in Table 5 shows the criterion which limits the zoom range for Examples 1 and 2. For example, for the lens of Example 1 if the zoom range were to be increased to 0.198, the distortion would exceed 1%, while for the lens of Example 2, if the zoom range were to be increased to 0.177, the color correction of the lens would drop below a half a pixel for lateral color and/or 2 pixels for axial color for wavelengths between 470 nanometers and 630 nanometers.

Table 6 summarizes various properties of the lens systems of the invention. As can be seen from this table, the lens systems of the invention achieve the preferred relationships set forth above regarding $P_0$ (=$1/f_0$) and $P_1$, $P_{S1, PS2}$, $P_2$, $P_{2P}$, $P_{2N}$, $D_{12}$, $D_{S1S2}$, $D_{1P1N}$, and $D_{2P2N}$.

In summary, the lenses of the invention achieve all of the desired properties listed above for projection lenses for use with pixelized panels. Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 134.9605 | 45.00000 | ACRYLIC | 220.00 |
| 2 | a | 348.1941 | 8.62976 | | 207.00 |
| 3 | | 230.1574 | 13.00000 | FD60 | 200.00 |
| 4 | | 136.5336 | Space 1 | | 179.00 |
| 5 | | 521.2834 | 23.00000 | FC5 | 142.12 |
| 6 | | −217.2857 | Space 2 | | 140.40 |
| 7 | | −401.1839 | 11.00000 | FEL6 | 93.16 |
| 8 | | −185.1807 | 27.79300 | | 93.12 |
| 9 | a | −128.3218 | 8.00000 | ACRYLIC | 90.00 |
| 10 | | 2115.1861 | Space 3 | | 96.00 |
| 11 | | Aperture stop | 321.37000 | | 81.12 |
| 12 | | ∞ | 2.00000 | ACRYLIC | 308.00 |
| 13 | acf | −145.1760 | Image distance | | 308.00 |

Symbol Description a—Polynomial asphere
c—Conic section
f—Fresnel

Conics

| Surface Number | Constant |
|---|---|
| 13 | −1.0000E + 00 |

Even Polynomial Aspheres

| Surf. No. | D | E | F | G | H | I |
|---|---|---|---|---|---|---|
| 1 | −1.5457E − 08 | 3.0560E − 12 | −3.7466E − 16 | 1.1699E − 20 | 2.0202E − 24 | −1.0151E − 28 |
| 2 | 2.1531E − 08 | 9.8359E − 12 | −1.9790E − 15 | 2.6450E − 19 | −1.5527E − 23 | 3.4627E − 28 |
| 9 | 4.3896E − 08 | −6.3309E − 11 | 9.1509E − 14 | −6.5759E − 17 | 2.3749E − 20 | −3.3880E − 24 |
| 13 | −2.9975E − 09 | 1.1630E − 14 | −2.8304E − 20 | 0.0000E + 00 | 0.0000E + 00 | 0.0000E + 00 |

Variable Spaces

| Pos. | Space 1 T(4) | Space 2 T(6) | Space 3 T(10) | Focal Shift | Image Distance |
|---|---|---|---|---|---|
| 1 | 115.081 | 56.378 | −37.017 | −0.495 | 9.999 |
| 2 | 111.879 | 56.378 | −74.519 | −0.228 | 9.992 |
| 3 | 116.995 | 56.378 | −9.880 | −0.404 | 9.995 |
| 4 | 115.081 | 46.000 | −4.750 | 1.000 | 10.009 |
| 5 | 115.081 | 75.000 | −88.000 | −2.000 | 10.093 |

SYSTEM FIRST ORDER PROPERTIES, POS 1

OBJ. HT: −1350.0   f/   4.00  MAG:   −0.1100
STOP: 0.00 after surface 11. DIA: 80.981
EFL:   627.485   FVD:   604.234   ENP:   386.760
IMD:   9.99915  BRL:   594.235
OBD:  −5200.63   OVL:   5804.87
SYSTEM FIRST ORDER PROPERTIES, POS 2

OBJ. HT: −3710.0   f/   4.00  MAG:   −0.0400
STOP: 0.00 after surface 11. DIA: 81.007
EFL:   542.999   FVD:   563.523   ENP:   260.814
IMD:   9.99177  BRL:   553.531

TABLE 1-continued

OBD: −13225.3    OVL:   13788.8
SYSTEM FIRST ORDER PROPERTIES, POS 3

OBJ. HT: −925.00    f/   4.30 MAG:   −0.1600
STOP: 0.00 after surface 11. DIA: 75.241
EFL:     706.650  FVD:     633.281  ENP:    500.675
IMD:       9.99470 BRL:    623.286
OBD:    −3769.40  OVL:    4402.68
SYSTEM FIRST ORDER PROPERTIES, POS 4

OBJ. HT: −1291.0    f/   4.40 MAG:   −0.1157
STOP: 0.00 after surface 11. DIA: 73.704
EFL:     670.653  FVD:     626.134  ENP:    477.592
IMD:      10.0094 BRL:     616.124
OBD:    −5185.62  OVL:    5811.75
SYSTEM FIRST ORDER PROPERTIES, POS 5

POS 5 System First Order Properties
OBJ. HT: −1471.0    f/   4.10 MAG:   −0.1010
STOP: 0.00 after surface 11. DIA: 78.860
EFL:     565.174  FVD:     571.968  ENP:    260.515
IMD:      10.0934 BRL:     561.874
OBD:    −5239.96  OVL:    5811.92

| Element Number | Surface Numbers | | Power | f' |
|---|---|---|---|---|

First Order Properties of Elements

| | | | | |
|---|---|---|---|---|
| 1 | 1 | 2 | 0.23969E − 02 | 417.21 |
| 2 | 3 | 4 | −0.22704E − 02 | −440.45 |
| 3 | 5 | 6 | 0.31569E − 02 | 316.77 |
| 4 | 7 | 8 | 0.15811E − 02 | 632.49 |
| 5 | 9 | 10 | −0.40862E − 02 | −244.73 |
| 6 | 12 | 13 | 0.34012E − 02 | 294.01 |

First Order Properties of Groups

| | | | | |
|---|---|---|---|---|
| 1 | 1 | 4 | 0.52599E − 03 | 1901.2 |
| 2 | 5 | 6 | 0.31569E − 02 | 316.77 |
| 3 | 7 | 10 | −0.23626E − 02 | −423.26 |
| 4 | 11 | 13 | 0.34012E − 02 | 294.01 |

TABLE 2

| Surf. No. | Type | Radius | Thickness | Glass | Clear Aperture Diameter |
|---|---|---|---|---|---|
| 1 | a | 123.4725 | 23.00000 | ACRYLIC | 155.96 |
| 2 | a | 268.9281 | 6.37000 | | 150.96 |
| 3 | | 185.7020 | 11.00000 | FD60 | 145.51 |
| 4 | | 122.5292 | Space 1 | | 134.15 |
| 5 | | 999.8936 | 15.00000 | BACD5 | 133.87 |
| 6 | | −280.9443 | Space 2 | | 133.97 |
| 7 | | ∞ | 15.00000 | | 114.00 |
| 8 | | −465.4986 | 13.00000 | BACD14 | 114.55 |
| 9 | | −215.1220 | 41.33000 | | 115.63 |
| 10 | a | −133.5451 | 9.00000 | ACRYLIC | 110.38 |
| 11 | a | 1999.9999 | Space 3 | | 114.18 |
| 12 | | Aperture stop | Image distance | | 112.94 |

Symbol Description a—Polynomial asphere
Even Polynomial Aspheres

| Surf. No. | D | E | F | G | H | I |
|---|---|---|---|---|---|---|
| 1 | −7.2724E − 09 | 2.0437E − 12 | −4.3841E − 16 | 2.1119E − 20 | 2.7645E − 24 | 4.6551E − 31 |
| 2 | 2.5764E − 08 | 4.6251E − 12 | −1.0544E − 15 | 1.3024E − 19 | −3.7725E − 24 | 3.5026E − 29 |
| 10 | 1.0147E − 07 | −2.0828E − 11 | 8.7030E − 15 | −3.5103E − 18 | 8.7106E − 22 | −8.5534E − 26 |
| 11 | 6.4862E − 08 | −1.5431E − 11 | 1.0319E − 15 | 6.3748E − 19 | −1.9275E − 22 | 1.7923E − 26 |

TABLE 2-continued

Variable Spaces

| Pos. | Space 1 T(4) | Space 2 T(6) | Space 3 T(11) | Focal Shift | Image Distance |
|---|---|---|---|---|---|
| 1 | 140.587 | 55.451 | −216.496 | −0.221 | 504.021 |
| 2 | 143.373 | 55.451 | −176.092 | −0.469 | 503.946 |
| 3 | 145.620 | 55.451 | −147.183 | −0.508 | 504.023 |
| 4 | 143.373 | 40.929 | −132.000 | 0.013 | 503.993 |
| 5 | 143.373 | 70.036 | −215.740 | −0.817 | 504.019 |

SYSTEM FIRST ORDER PROPERTIES, POS 1

OBJ. HT: −2550.0  f/  4.50 MAG:  −0.0400
STOP: 0.00 after surface 12. DIA: 112.78
EFL:   581.441 FVD:   617.263 ENP:  −5.08552
IMD:   504.021 BRL:   113.242
OBD:  −15244.0 OVL:   15861.3

SYSTEM FIRST ORDER PROPERTIES, POS 2

OBJ. HT: −940.00  f/  4.50 MAG:  −0.1100
STOP: 0.00 after surface 12. DIA: 112.82
EFL:   582.019 FVD:   660.378 ENP:   63.0101
IMD:   503.946 BRL:   156.432
OBD:  −5997.26 OVL:   6657.64

SYSTEM FIRST ORDER PROPERTIES, POS 3

OBJ. HT: −635.00  f/  4.70 MAG:  −0.1600
STOP: 0.00 after surface 12. DIA: 107.99
EFL:   582.486 FVD:   691.611 ENP:   120.116
IMD:   504.023 BRL:   187.588
OBD:  −4345.28 OVL:   5036.89

SYSTEM FIRST ORDER PROPERTIES, POS 4

OBJ. HT: −872.00  f/  4.65 MAG:  −0.1169
STOP: 0.00 after surface 12. DIA: 109.02
EFL:   612.010 FVD:   689.995 ENP:   135.082
IMD:   503.993 BRL:   186.002
OBD:  −5966.40 OVL:   6656.40

SYSTEM FIRST ORDER PROPERTIES, POS 5

OBJ. HT: −982.00  f/  4.50 MAG:  −0.1040
STOP: 0.00 after surface 12. DIA: 112.93
EFL:   554.718 FVD:   635.388 ENP:   4.64639
IMD:   504.019 BRL:   131.369
OBD:  −6017.35 OVL:   6652.73

| Element Number | Surface Numbers | | Power | f' |
|---|---|---|---|---|

First Order Properties of Elements

| 1 | 1 | 2 | 0.22760E − 02 | 439.36 |
| 2 | 3 | 4 | −0.20800E − 02 | −480.77 |
| 3 | 5 | 6 | 0.26849E − 02 | 372.46 |
| 4 | 8 | 9 | 0.15435E − 02 | 647.86 |
| 5 | 10 | 11 | −0.39498E − 02 | −253.18 |

First Order Properties of Groups

| 1 | 1 | 4 | 0.44587E − 03 | 2242.8 |
| 2 | 5 | 6 | 0.26849E − 02 | 372.46 |
| 3 | 7 | 11 | −0.21936E − 02 | −455.87 |

TABLE 3

| Example | U1 | U1$_{S1}$ | U1$_{S2}$ | U2 |
|---|---|---|---|---|
| 1 | S1–S6 | S1–S4 | S5–S6 | S7–S10 |
| 2 | S1–S6 | S1–S4 | S5–S6 | S8–S11 |

TABLE 4

| Example | Focus Positions | Zoom Positions |
|---|---|---|
| 1 | 1,2,3 | 1,4,5 |
| 2 | 1,2,3 | 2,4,5 |

TABLE 5

| Example | Panel Size (mm) | Pixel Size (mm) | Focus Range[1] | Zoom Range[2] (%) | Limitation[3] | Distortion (d) (%) |
|---|---|---|---|---|---|---|
| 1 | 203 × 152 | 0.2 | 0.12 | 0.132 | Distortion | −0.25 < d < 0.25 |
| 2 | 118 × 88 | 0.09 | 0.12 | 0.118 | Color[4] | 0 < d < 0.1 |

[1]Defined as the difference between the absolute values of the conjugate magnification range
[2]Defined as the zoom range for which the image quality, including distortion, is satisfactory
[3]The image quality component that limits the available zoom range.
[4]Acceptable values of lateral color and axial color blur are 0.5 pixels and 2 pixels respectively.

TABLE 6

| Example | $P_0$ | $P_1$ | $P_{S1}$ | $P_{S2}$ | $P_2$ | $P_{2P}$ | $P_{2N}$ | $D_{12}$ | $D_{S1S2}$ | $D_{1P1N}$ | $D_{2P2N}$ |
|---|---|---|---|---|---|---|---|---|---|---|---|
| 1 | 0.0019 | 0.0029 | 0.0005 | 0.0032 | −0.0024 | 0.0016 | −0.0041 | 56.38 | 111.88 | 8.63 | 27.79 |
| 2 | 0.0017 | 0.0026 | 0.0004 | 0.0027 | −0.0022 | 0.0015 | −0.0039 | 70.45 | 140.59 | 6.37 | 41.33 |

What is claimed is:

1. A projection lens for forming an image of an object, said projection lens having a power $P_0$, a focal length $f_0$, and comprising in order from its image end to its object end:
   (A) a first lens unit having a positive power $P_1$, said first lens unit comprising in order from its image side to its object side:
      (i) a first lens subunit having a positive power $P_{S1}$; and
      (ii) a second lens subunit having a positive power $P_{S2}$, said second lens subunit being spaced from said first lens subunit by an axial distance $D_{S1S2}$; and
   (B) a second lens unit having a negative power $P_2$, said second lens unit being spaced from said first lens unit by an axial distance $D_{12}$ and comprising in order from its image side to its object side:
      (i) a positive lens element having a power $P_{2P}$; and
      (ii) a negative lens element having a power $P_{2N}$, said negative lens element being spaced from said positive lens element by an axial distance;
wherein:
   $1.0 < P_1/P_0 < 2.0$;
   $0.1 < P_{S1}/P_0 < 0.4$:
   $1.0 < P_{S2}/P_0 < 2.0$;
   $0.5 < |P_2|/P_0 < 2.0$:
   $0.5 < |P_{2P/P0}| < 1.5$; and
   $1.5 < |P_{2N}|/P_0 < 3.0$.

2. The projection lens of claim 1 wherein the first lens subunit comprises a positive lens element and a negative lens element, the positive lens element being on the image side of the first lens subunit and the negative lens element being on the object side of that subunit, said positive and negative lens elements being separated by an axial distance.

3. The projection lens of claim 1 wherein the first lens subunit consists of a positive lens element and a negative lens element, the positive lens element being on the image side of the first lens subunit and the negative lens element being on the object side of that subunit, said positive and negative lens elements being separated by an axial distance.

4. The projection lens of claim 2 or 3 wherein:
   (a) the positive lens element of the first lens subunit is composed of plastic, has at least one aspherical surface, and has a V-value $V_P$;
   (b) the negative lens element of the first lens subunit is composed of glass and has a V-value $V_N$; and
   (c) $V_{P>VN}$.

5. The projection lens of claim 1 wherein the second lens subunit consists of a single lens element.

6. The projection lens of claim 5 wherein the single lens element is composed of glass and has spherical surfaces.

7. The projection lens of claim 1 wherein the second lens unit consists of said positive lens element and said negative lens element.

8. The projection lens of claim 1 wherein the positive lens element of the second lens unit is composed of glass and has spherical surfaces.

9. The projection lens of claim 1 wherein the negative lens element of the second lens unit is composed of acrylic and has at least one aspherical surface.

10. A projection lens for forming an image of an object, said projection lens having a power $P_0$, a focal length $f_0$, and consisting in order from its image end to its object end of:
   (A) a first lens unit having a positive power $P_1$, said first lens unit consisting in order from its image side to its object side of:
      (i) a first lens subunit having a positive power $P_{S1}$; and
      (ii) a second lens subunit having a positive power $P_{S2}$, said second lens subunit being spaced from said first lens subunit by an axial distance $D_{S1S2}$;
   (B) a second lens unit having a negative power $P_2$, said second lens unit being spaced from said first lens unit by an axial distance $D_{12}$ and consisting in order from its image side to its object side of:
      (i) a positive lens element having a power $P_{2P}$; and
      (ii) a negative lens element having a power $P_{2N}$, said negative lens element being spaced from said positive lens element by an axial distance; and optionally
   (C) a field lens unit;
wherein:
   $1.0 < P_1/P_0 < 2.0$;
   $0.1 < P_{S1}/P_0 < 0.4$;
   $1.0 < P_{S2}/P_0 < 2.0$;
   $0.5 < |P_2|/P_0 < 2.0$
   $0.5 < P_{2P}/P_0 < 1.5$; and
   $1.5 < |P_{2N}|/P_0 < 3.0$.

11. The projection lens of claim 10 wherein the first lens subunit consists of a positive lens element and a negative lens element, the positive lens element being on the image side of the first lens subunit and the negative lens element being on the object side of that subunit, said positive and negative lens elements being separated by an axial distance.

12. The projection lens of claim 10 or 11 wherein the second lens subunit consists of a single lens element.

13. The projection lens of claim 1 or 10 wherein:
0.5<$D_{12}/f_0$<0.25; and
0.1<$D_{S1,S2}/f_0$<0.4.

14. The projection lens of claim 1 or 10 wherein the object is a pixelized panel.

15. A projection lens system comprising:
(a) an illumination system comprising a light source and illumination optics which forms an image of the light source, said image of the light source being the output of the illumination system;
(b) a pixelized panel; and
(c) a projection lens for forming an image of the pixelized panel, said projection lens having a short conjugate side in the direction of the pixelized panel, a long conjugate side in the direction of the image of the pixelized panel, and consisting in order from its long conjugate side to its short conjugate side of:
  (A) a first lens unit having a positive power, said first lens unit comprising in order from the projection lens' long conjugate side to its short conjugate side of:
    (i) a first lens subunit having a positive power; and
    (ii) a second lens subunit having a positive power, said second lens subunit being spaced from said first lens subunit by an axial distance;
  (B) a second lens unit having a negative power, said second lens unit being spaced from said first lens unit by an axial distance and comprising in order from the projection lens' long conjugate side to its short conjugate side of:
    (i) a positive lens element having a power; and
    (ii) a negative lens element having a power, said negative lens element being spaced from said positive lens element by an axial distance; and optionally
  (C) a field lens unit.

16. The projection lens system of claim 15 wherein said projection lens has an entrance pupil whose location substantially corresponds to the location of the output of the illumination system.

* * * * *